US006908394B2

(12) United States Patent
Amborn

(10) Patent No.: US 6,908,394 B2
(45) Date of Patent: Jun. 21, 2005

(54) HIGHLY EFFICIENT SHAFT COUPLING

(76) Inventor: Petert Amborn, In den Gaerten 2, Neunkirchen (DE), D-53819

( * ) Notice: Subject to any disclaimer, the term of this patent is extended or adjusted under 35 U.S.C. 154(b) by 0 days.

(21) Appl. No.: 10/393,648

(22) Filed: Mar. 20, 2003

(65) Prior Publication Data

US 2003/0181246 A1 Sep. 25, 2003

(30) Foreign Application Priority Data

Mar. 23, 2002 (DE) .......................... 102 13 117

(51) Int. Cl.[7] .............................. F16C 3/03; F16D 3/06
(52) U.S. Cl. ........................................ 464/167; 384/49
(58) Field of Search ................. 464/141, 142, 464/143, 146, 167, 169, 902, 906; 384/49

(56) References Cited

U.S. PATENT DOCUMENTS

| | | | | |
|---|---|---|---|---|
| 2,791,894 A | * | 5/1957 | Duckworth | ................. 464/168 |
| 2,979,147 A | * | 4/1961 | Naumann | ................... 180/358 |
| 2,995,908 A | * | 8/1961 | Mazziotti et al. | .......... 464/168 |
| 3,449,927 A | | 6/1969 | Field | |
| 3,657,780 A | * | 4/1972 | Stolte | .................... 29/898.066 |
| 3,800,558 A | * | 4/1974 | Buthe et al. | ................ 464/168 |
| 4,149,392 A | * | 4/1979 | Kimberlin | .................. 464/146 |
| 5,685,777 A | * | 11/1997 | Schwarzler | ................ 464/145 |

FOREIGN PATENT DOCUMENTS

| | | |
|---|---|---|
| DE | 849 049 | 12/1951 |
| DE | 214785 | 5/1959 |
| DE | 1 084 091 | 6/1960 |
| DE | 1 755 556 | 8/1971 |
| DE | 38 18 329 | 12/1989 |
| DE | 199 11 111 | 3/1999 |
| WO | WO 00/14418 | 3/2000 |

* cited by examiner

*Primary Examiner*—Kenneth Thompson
(74) *Attorney, Agent, or Firm*—Jordan and Hamburg LLP

(57) ABSTRACT

A shaft coupling for a drive shaft (3), with a driving and a driven coupling component in which the driving or the driven coupling component is configured to form a cylindrical hollow coupling outer member (8) and the other coupling component configured to form a cylindrical coupling inner member (9), the two members being disposed so as to be coaxial with the longitudinal axis of the shaft coupling, and in which axially parallel grooves (27, 28) that are provided with right- and left-sided side walls (19, 20, 21, 22) are formed on the inner circumference of the coupling outer member (8) and on the outer circumference of the coupling inner member (9) for receiving rolling members (11) that drivingly and axially slidably interconnect the coupling outer member (8) and the coupling inner member (9), whereby the right- and left-sided side walls (19, 20, 21, 22) of the coupling inner member (8) and of the coupling outer member (9) are disposed side by side and mesh together thereby in such a manner that, together with a side wall (19, 20) of a groove (27) of the coupling inner member (9), a respective one of the side walls (21, 22) of a groove (28) of the outer member (8) defines and/or forms a rolling member passage (13, 14).

40 Claims, 9 Drawing Sheets

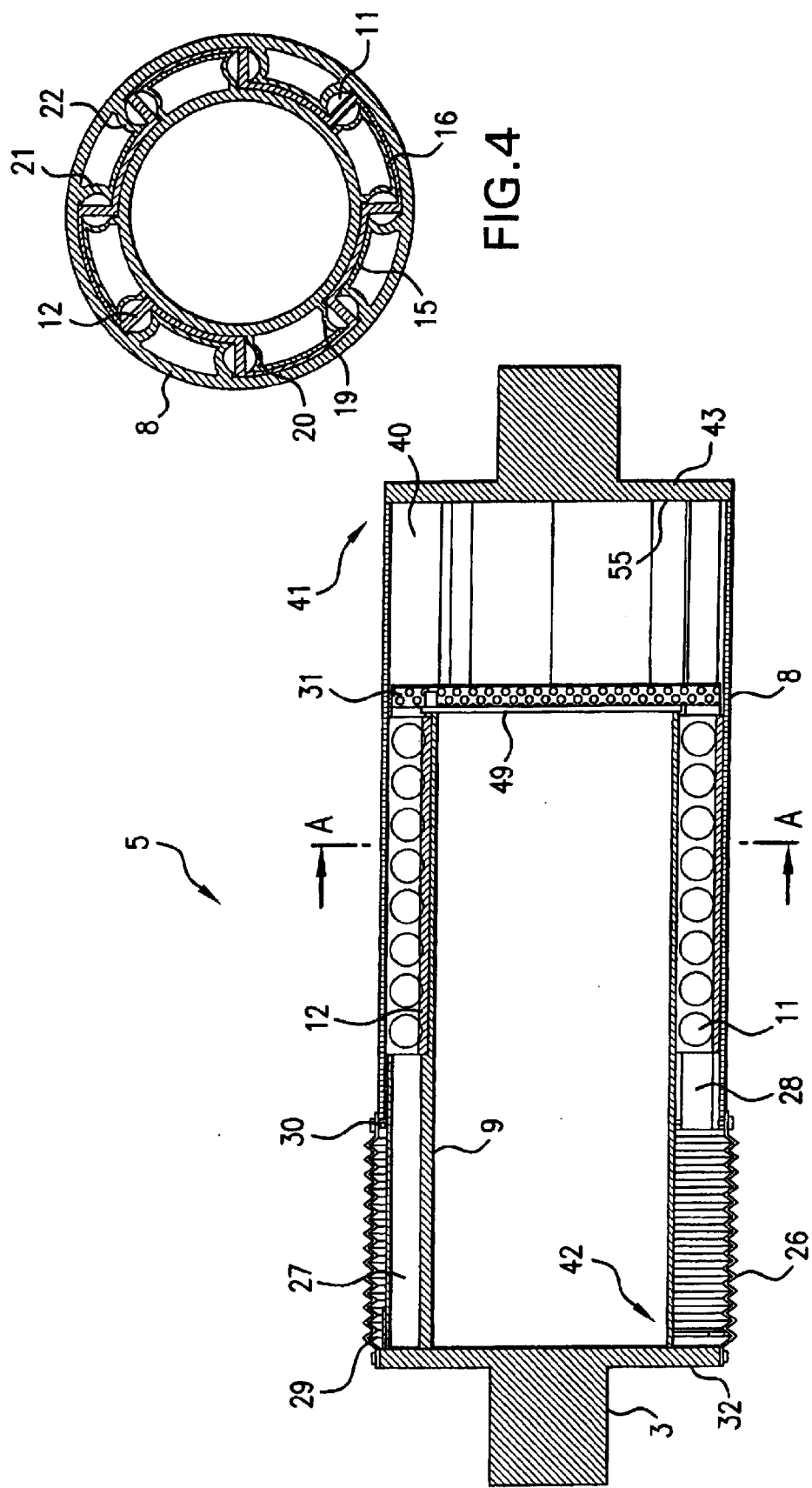

HIGHLY EFFICIENT SHAFT COUPLING

BACKGROUND OF THE INVENTION

The invention relates to a shaft coupling for an axially slidable drive shaft.

Such a shaft coupling, which is known from DE 199 11 111 C1 for example, has an increased diameter cylindrical hollow tube end portion on the inner periphery of which axially parallel grooves are formed that serve to receive rolling members. An inner member of the cylindrical shaft coupling is disposed coaxially within said cylindrical hollow tube end portion, said inner member being provided, on the outer periphery thereof, with rolling member passages that are also oriented in an axially parallel manner and being connected, at the portion thereof pointing away from the tube end portion, to a constant velocity universal joint.

The inner grooves of the hollow cylindrical tube end portion and outer grooves of the coupling inner member are oriented toward each other in such a manner that they are facing each other for the purpose of bearing together the rolling members. The depth of the passage grooves for the rolling members and the diameter of the rolling members are configured in such a way that the rolling members hold the inner member and the outer member of the shaft coupling in a spaced-apart relationship on the one side and that they plunge so deeply into the passage grooves for the rolling members mentioned that the side walls of the grooves provide enough contact surface for transmitting a force to the rolling members and for leading said force out of them again.

With respect to an optimum force transmission between the driving and the driven shaft coupling component, this structural design is always a compromise because of the wish for axial slidability.

With respect to the force transmission from the driving shaft coupling member to the rolling members and with respect to said force being transmitted further from the rolling members to the driven shaft coupling member, only part of the force acting in the circumferential direction of the coupling inner member and of the coupling outer member can be transmitted so as to produce a driving effect in the known axially slidable shaft couplings as a result of these margin conditions. Because of the geometric situation described, another part of the forces applied to the rolling members does not act in the circumferential direction but in a more or less radially outward direction. This is not only detrimental to the efficiency of the torque transmission from the driving to the driven shaft coupling member but also causes a non negligible mechanical boring friction load to be exerted on the rolling member passages mentioned.

Beside the usual structural design of axially slidable shaft couplings described herein above, another axially slidable shaft coupling is known from U.S. Pat. No. 3,449,927 C1 in which a cylindrical coupling outer member has an approximately cruciform interior space in cross-section, said interior space serving to receive a rectangular coupling inner member. Passages for the rolling members are formed at the end of the branches of said cross, said passages being respectively disposed in the right and left corners of the branches and being held apart by spacers inserted in the grooves of the branches between the rolling members. The force is transmitted to the rolling member in such a manner that but one row of rolling members in each branch of the cross is used for transmitting the torque whereas the other row of rolling members remains mechanically unloaded.

The drawbacks described herein above with respect to the efficiency of the torque transmission and to the boring friction load exerted on the rolling member passages are not overcome by this prior art either.

Another aspect in using axially slidable shaft couplings more specifically in motor vehicle propeller shafts is that these shafts rotate at very high speeds, often exceeding 10,000 revolutions per minute. These high speeds generate very high centrifugal forces on the rolling members of such type shaft couplings, adding to the mechanical load exerted on the rolling members and on the rolling member passages.

BRIEF SUMMARY OF THE INVENTION

In view thereof, it is the object of the invention to propose an axially slidable shaft coupling that, on the one side, ensures the axial slidability of the coupling inner member and of the coupling outer member and that, on the other side, has a higher torque transmission efficiency, thus considerably reducing the radial load on the bearing.

The solution to this object will become apparent in the features recited in the main claim whereas advantageous embodiments and developments of the invention can be inferred from the subordinate claims.

Accordingly, the shaft coupling for a drive shaft has, just as hereto before, a driving and a driven coupling component that are configured to form a cylindrical hollow coupling outer member and a cylindrical coupling inner member respectively. The coupling inner member can hereby be either a cylindrical hollow component or a solid component. In any event the coupling inner member is disposed coaxially within the coupling outer member.

At their respective inner and outer periphery, the coupling outer member and the coupling inner member have longitudinal grooves for receiving rolling members that drivingly connect the driven coupling component to the driving coupling component and that additionally allow for easy relative axial slidability of these two components.

In this shaft coupling there is provided that the right and left side walls of the longitudinal grooves of the coupling inner member and of the coupling outer member are disposed side by side and mesh together in such a manner that, together with a side wall of a longitudinal groove of the coupling inner member, a respective one of the side walls of a longitudinal groove of the coupling outer member defines or forms a rolling member passage.

Because of this provision, the forces acting in the circumferential direction of the driving coupling member are transmitted further in this direction only to the rolling members and next to the driven coupling component.

With regard to the side walls, there may be provided, with ball-shaped rolling members in particular, that said walls extend substantially radially inward or outward to such an extent that their height is preferably greater than or equal to the rolling member radius. With barrel-shaped or cylindrical rolling members, the construction may differ from this variant.

As already mentioned, the rolling members can have a ball-shaped, a barrel-shaped or a cylindrical cross-sectional geometry and can be disposed in a common rolling member cage for example. It is however also possible to provide individual rolling member cages of the type of so-called plate cages for the rolling members of every rolling member passage, the rolling members disposed behind each other only being disposed in this rolling member cage. The rolling member cages are preferably made from a plastic material such as polyethylene, although metallic rolling member cages can also be utilized. The rolling members can be made from a plastic material or from a metal alloy, preferably from a light metal alloy.

To reduce the manufacturing cost there may be provided that all of the components of a coupling outer member and/or of a coupling inner member have the same wall thickness so that these two components can be manufactured at very low cost by means of an extrusion moulding method or an extrusion method. Depending on the torques to be transmitted, the material chosen may be a thermoplastic material, light metal alloys or steel alloys.

The regions between the side walls of the longitudinal grooves of the coupling outer member and/or of the coupling inner member can be configured either to be solid or as hollow sections. Hollow sections will, for example, be chosen when small forces are to be transmitted and when the shaft coupling is to be of the lightest possible construction and manufactured at low cost. By contrast, solid regions between the side walls of the grooves are preferred when very high forces are to be transmitted from the driving to the driven coupling component.

If the coupling inner member and/or the coupling outer member is made of an aluminum or magnesium-based light metal alloy, it will preferably be provided with a hardened and/or coated surface. In the case of an aluminum alloy, the surface of these components can also be provided with a hard anodized coating.

In another embodiment of the invention there may be provided that metallic inserts or cores are inserted in the hollow spaces of the hollow sections defined by the groove side walls, the inserts or cores permitting to considerably enhance e.g., the flexural strength or the torque transmission capacity of such a coupling inner member or coupling outer member obtained, for example, by extrusion of a plastic material or of a light metal.

Another embodiment of the invention is concerned with the connection of the shaft coupling with components of a drive shaft or of a drive shaft arrangement that are disposed upstream or downstream thereof. There is thereby provided that the coupling inner member and/or the coupling outer member are connected by their right- or left-sided end portion with the respective one of the shaft components arranged upstream or downstream thereof, for example with a tube segment or with a universal joint, each connection being performed using a respective flange. This connection may be performed in a conventional manner by means of soldered or welded joints and an expansion bellows made from a rubber-elastic material may cover the connection region and the region of axial displacement to protect them from dirt.

Further, there may be provided that the flange is provided, on its front side oriented toward the shaft coupling, with a profile extending coaxially with the longitudinal axis of the flange for the purpose of forming a plug connection, the profile being formed in the coupling inner member or in the coupling outer member respectively so as to be exactly inverse to the geometry of the grooves and/or of the hollow spaces of the hollow sections. When the coupling inner member or the coupling outer member is connected with the flange, this profile is plugged into the above mentioned grooves or hollow spaces and is additionally axially secured by means of a ring and groove snap-on type connector that is conventional in the art and has therefore not been illustrated herein or by means of a solder or weld connection. As a matter of course, the shaft coupling can also be directly connected to a swivel joint, at least at one end thereof.

A seal preventing dirt from entering into the axially active displacement unit and lubricant from leaking may moreover be provided between the flange and the passage grooves of the coupling inner member or of the coupling outer member.

Finally, the coupling inner member and/or the coupling outer member can also be configured to be a tubular part the outer or inner circumference of which is not completely round. In the cross-sectional geometry of these parts, grooves and lands alternate on a circumference, the lands of the one coupling outer member being disposed in the grooves of the outer coupling component. For receiving the rolling members, the grooves and lands are provided with substantially radially oriented side walls in which rolling member passages are formed or which themselves form the side walls of the very rolling member passages.

The invention will be explained further with the aid of concrete exemplary embodiments with reference to the accompanying drawing.

BRIEF DESCRIPTION OF THE SEVERAL VIEWS OF THE DRAWING

FIG. 3 is a longitudinal section schematic illustration of a shaft coupling according to the invention, FIG. 4 is a cross-sectional view taken along AA of FIG. 3.

DETAILED DESCRIPTION OF THE INVENTION

Figure 1:
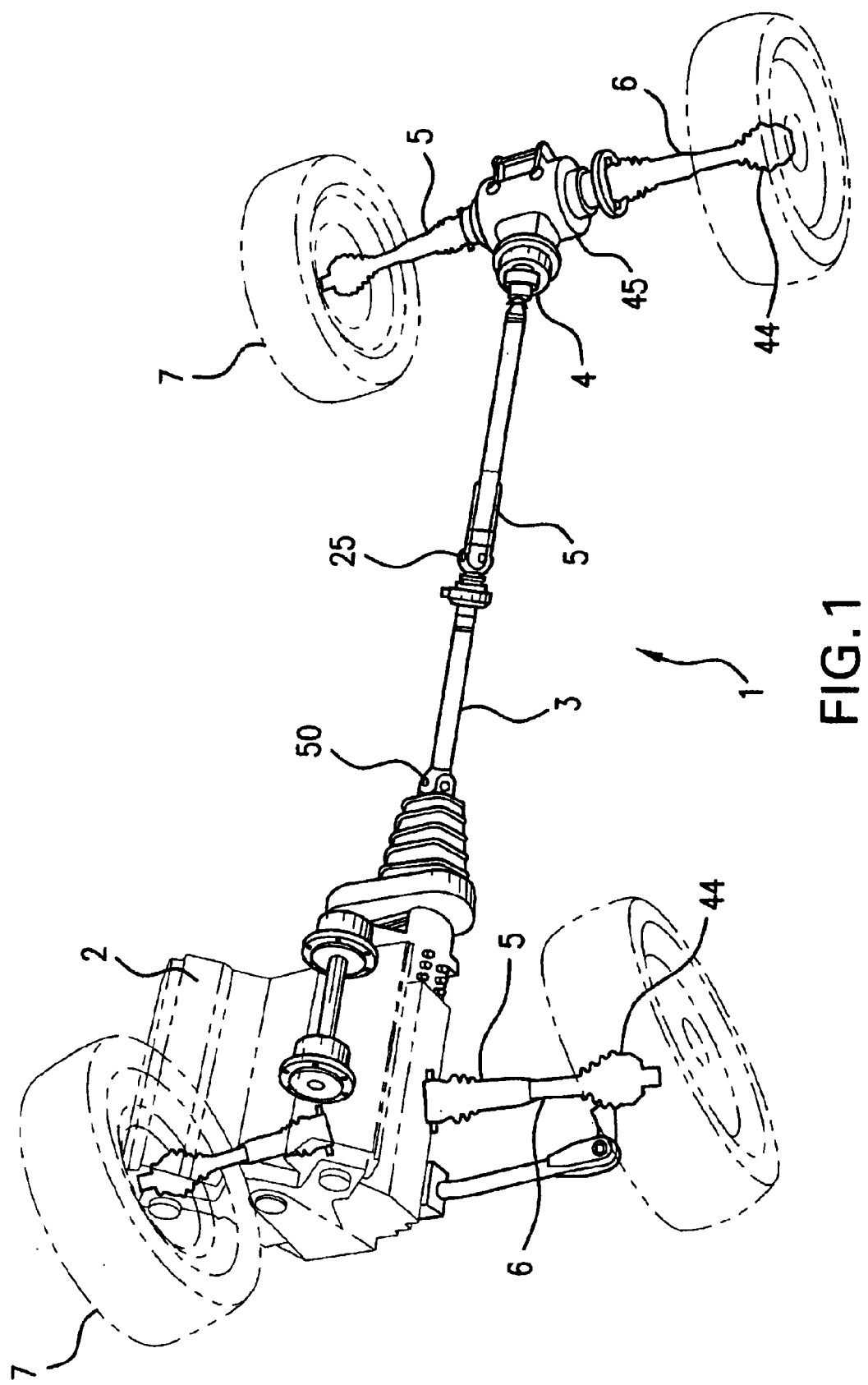
FIG. 1 is a general view of a drive unit of a motor vehicle.

Accordingly, FIG. 1 shows a complete drive unit 1 of a four-wheel motor vehicle with a power unit 2 that produces and distributes a drive torque for drive wheels 7 of front and rear axles. A distributor gear, which is not shown in detail herein and which distributes the torque supplied by the engine to the drive shafts or side shafts 6 of the front wheels and, through a propeller shaft 3, to the drive or side shafts 6 of the rear wheels, is provided for this purpose.

It can be further surveyed from FIG. 1 that the propeller shaft 3 is made of two pieces and is connected to the distributor gear, that is located in proximity to the engine and has not been illustrated in detail herein, by way of a swivel joint 50 on the one side and to a differential gear 45 through another swivel joint 4 on the other side. A further swivel joint 25, which is connected to an axially slidable shaft coupling 5 according to the invention, is moreover provided in the center between the two portions of the propeller shaft 3. One function, inter alia, of said shaft coupling 5 is to prevent vibrations originating from the power unit 2 and acting in an axial direction from being transmitted to the vehicle wheels 7 on the rear axle. The structure and functioning in accordance with the invention of a displacement unit 5 acting as a shaft coupling will be described further starting with FIG. 3.

It is further obvious from FIG. 1 that the drive shafts 6 leading to the vehicle wheels 7 are provided with swivel joints 44 by means of which the steering angle in the region of the front steered wheels is for example drivingly compensated for.

In such type drive units, the shaft coupling or displacement unit 5 can be advantageously used in combination with a plurality of simple universal joints 50, flexible rubber couplings 53, fixed joints 44 or constant velocity universal joints (VL, DO, tripod joints) or with constant velocity fixed joints, the joints being usable in any combination that makes sense for the intended application.

Figure 2:
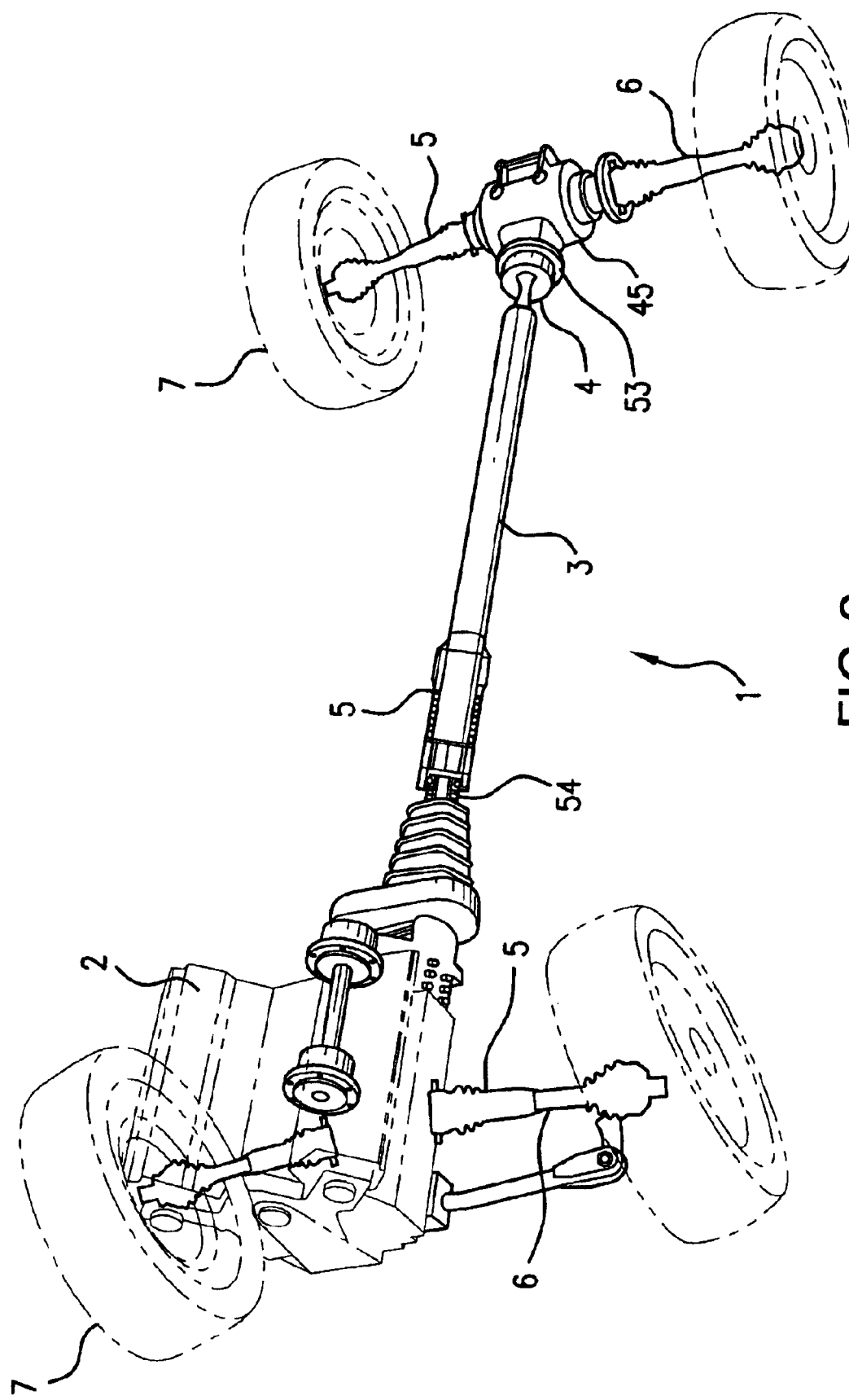
FIG. 2 is an illustration according to FIG. 1 with another drive unit construction.

Accordingly, FIG. 2 shows a drive unit 1 for a motor vehicle in which the shaft coupling (displacement unit 5) mounted on the propeller shaft 3 is made in one piece and is directly disposed behind a plunging joint 54 located on the side of the distributor gear.

Such a shaft coupling 5 in accordance with the invention is shown in FIG. 3 in a longitudinal section schematic illustration. As can be surveyed from this illustration, a coupling outer member 8 is formed by a cylindrical hollow component at an inner circumference of which longitudinal grooves 28 for receiving roller members 11 are formed coaxially with the longitudinal axis of the coupling outer member 8.

In this exemplary embodiment, the rolling members 11 are balls that are arranged in a ball cage 12 made from a plastic material such as polyethylene. The ball cage 12 may also be made of a metal alloy though.

As to the rolling members 11, they may be made from a plastic material or from a light metal alloy. It also makes sense to make barrel-shaped or cylindrical rolling members hollow by means of at least one bore drilled in an axially parallel manner so that the high speeds occurring, for example, with vehicle propeller shafts, are prevented from generating high centrifugal forces on these rolling members so that they exert only a small mechanical load on the rolling member passages.

A cylindrical hollow coupling inner member 9 is disposed coaxially within the already mentioned coupling outer member 8, longitudinal grooves 27 for the rolling members 11 being formed on an outer circumference of the inner member 9 so as to also be coaxial with the longitudinal axis thereof. Further, the longitudinal grooves 27 and 28 of the coupling outer member 8 and coupling inner member 9 are oriented in such a manner that they face each other and receive between them the rolling members 11. The rolling members 11 thereby ensure driving connection and easy axial slidability between the coupling outer member 8 and the coupling inner member 9.

At its right end portion 41, the coupling outer member 8 is connected to a connecting flange 43 on a front side 55 directed toward the shaft coupling 5 of which inserts or cores 40, oriented axially parallel with the longitudinal axis of the shaft coupling 5, are fastened, the inserts or cores 40 engaging in the grooves 28 of the shaft coupling outer member 8 in the manner of a plug-type connection. The flange 43 may be secured against accidental removal by additionally connecting it to the tubular coupling outer member 8 through a weld or solder connection which has not been illustrated herein or through a discrete ring and groove snap-on type connector which is conventional in the art or by means of screws.

A seal 31 for preventing lubricant from leaking or dirt from entering into the shaft coupling 5 is disposed at the front end of the shaft coupling 5. At the other side, viewed in an axial direction, the coupling inner member 9 is, for example, connected to a flange 32 that seals the shaft coupling 5 at this other end for dirt exclusion and that provides a driving connection with the adjacent drive shaft component 3. The displacement region of shaft coupling 5 is moreover covered by an expansion bellows 26 that is fastened to the outer periphery of the flange 32 and to the outer periphery of the coupling outer member 8 by means of screws, clamping rings or other fastening means 30.

This FIG. 3 also shows stops 29, 30 and 49 that limit to a desired length the displacement path between the coupling outer member 8 and the coupling inner member 9 and that prevent the ball cage 12 from leaving the position it was assigned.

In a cross-sectional view taken along line AA of FIG. 3 and shown in FIG. 4, the coupling inner member 9 is configured as a tubular body that has a fully closed circular inner side in this exemplary embodiment. On the outer circumference of the coupling inner member 9, by contrast, coaxially oriented hollow sections 16 are formed the right and left side walls 19, 20 of which define, grooves 27.

In this exemplary embodiment, the coupling outer member 8, by contrast, has a fully closed circular outer surface, axially parallel hollow sections 15, side walls 21, 22 of which define grooves 28 being formed on the inner side thereof.

The hollow sections 15 and 16 of coupling inner member 9 and coupling outer member 8 are arranged so as to mesh together in such a manner that the hollow sections 16 of the coupling inner member 9 engage in the grooves 28 of the coupling outer member 8 and that the hollow sections 15 of the coupling outer member 8 engage in the grooves 27 of the coupling inner member 9. The side walls 19, 20, 21, 22 of the hollow sections 15, 16 thereby enclose the rolling members 11 between opposing side walls in such a manner that these side walls form, or at least define, the passages for said rolling members 11. According to the exemplary embodiment of FIG. 4 there may be provided that the wall thickness of the side walls 21, 22 of the coupling outer member is thicker than the side walls 19, 20 of the coupling inner member 9.

Figure 5:
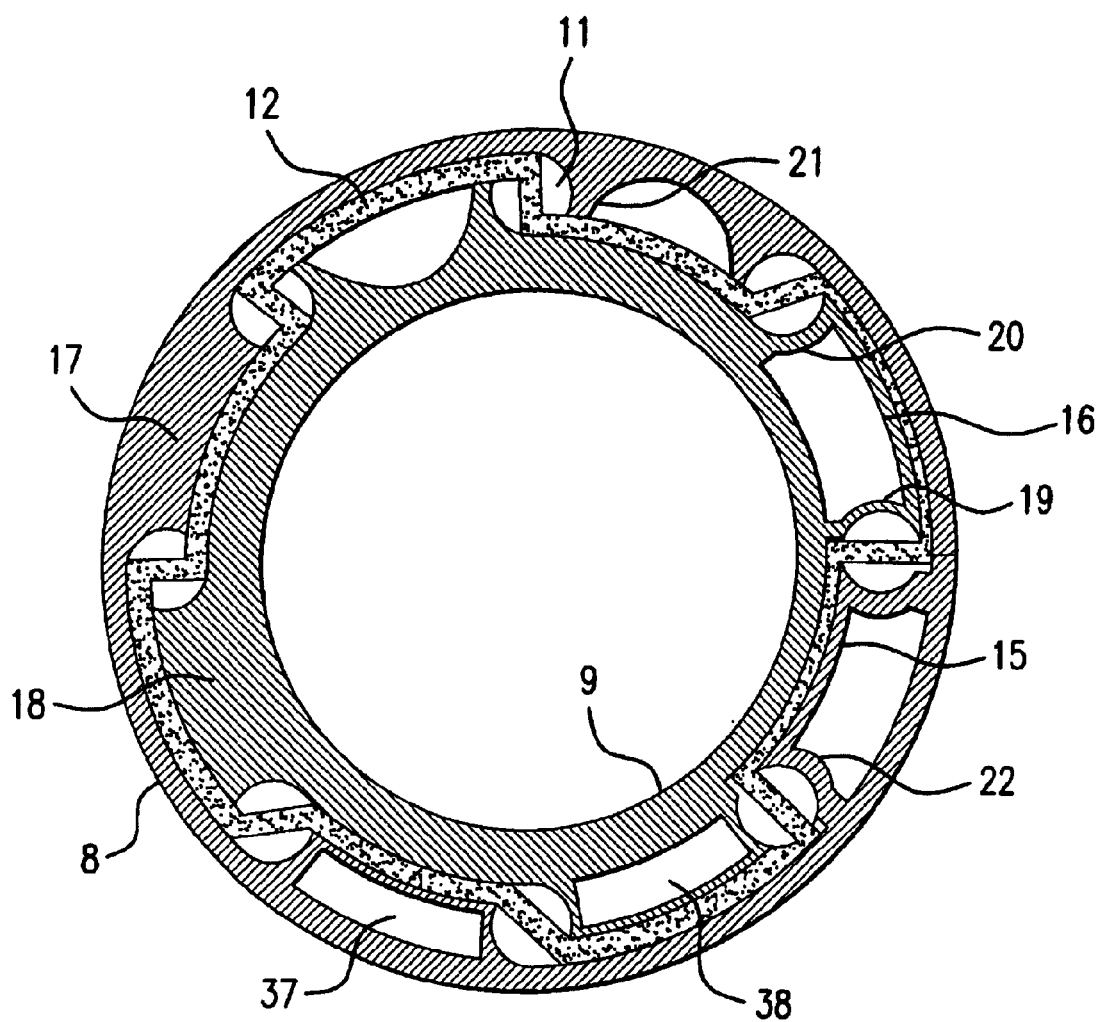
FIG. 5 is a cross-sectional illustration of a shaft coupling with various construction variants.

In FIG. 5, the structural design of the coupling inner member 9 and of the coupling outer member 8 is shown in a slightly larger illustration provided with more variants. At first, it can be surveyed therefrom that the coupling outer member 8 and the coupling inner member 9 are provided with hollow sections 15, 16 having side walls 21, 22 and 19, 20 respectively, grooves being formed therein between.

The hollow sections 15, 16 can have very different cross-sectional geometries and may form a rectangular hollow space 37, 38 or a hollow space with a curved cross-section for example. Furthermore, the side walls 19 through 22 can be curved, straight or inclined inward toward the hollow spaces 37, 38. Finally, the sections defining the grooves 27, 28 may be configured as solid sections 17, 18 or may be formed on the coupling inner member 9 or on the coupling outer member 8.

In any event, the substantially radially oriented side walls 19 through 22 form the passages for the rolling members 11 which, in the exemplary embodiment shown in this FIG. 5, are kept in their position by a ball cage 12 with differing geometry and wall thickness.

Figure 5A:
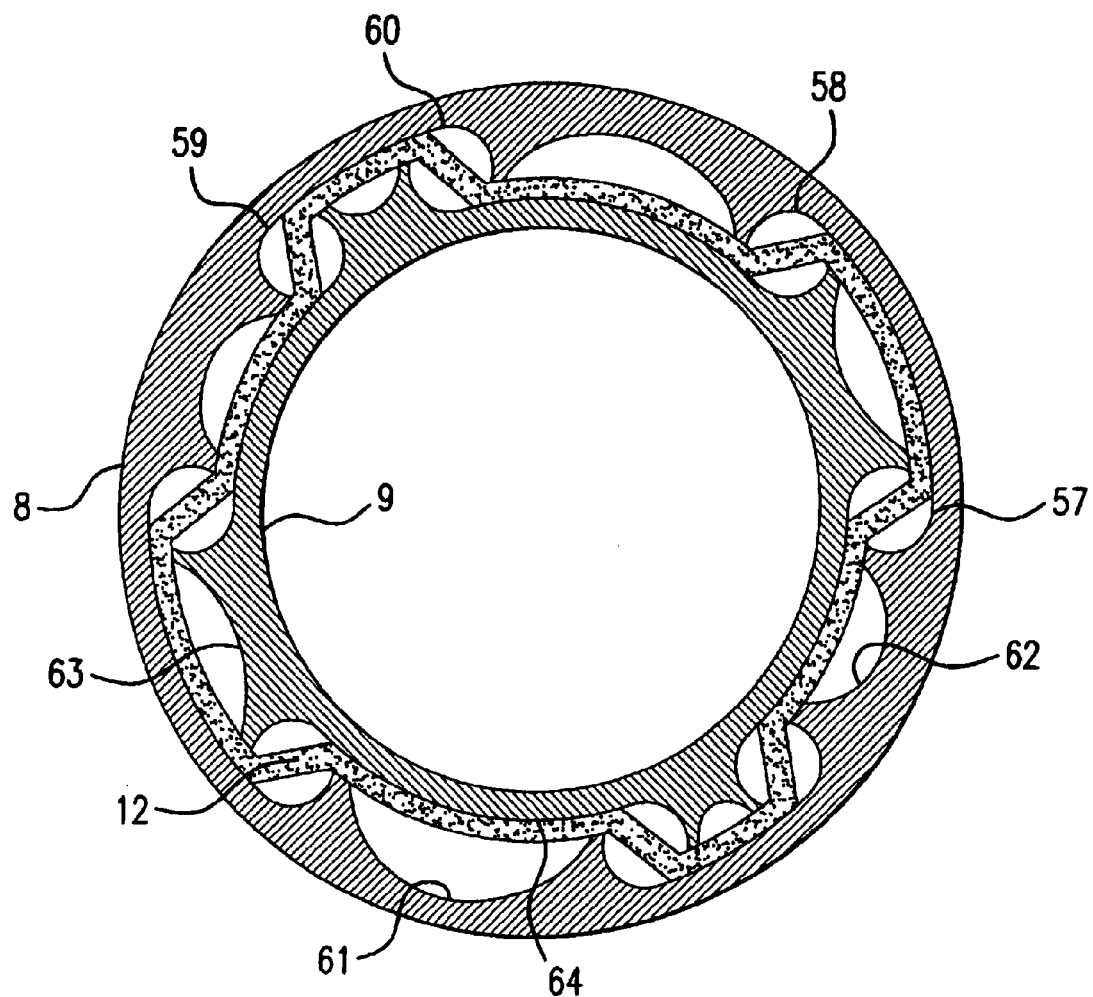
FIG. 5a is a cross-sectional illustration similar to FIG. 5 but with the rolling member passages arranged side by side in pairs.

As shown in FIG. 5a, any number of rolling member passages may be peripherally distributed about the shaft coupling, at least two, but preferably eight or more such rolling member passages being provided. In the exemplary embodiment according to FIG. 5a, two rows of closely spaced rolling members pairs 59, 60 and two rows of rolling members 58, 57 that are spaced a greater distance apart are disposed. The thus paired rows of rolling members 57, 58 and 59, 60 may be separated by coaxial inner grooves 61, 62 of differing width and/or depth provided on the coupling outer member 8 or by coaxial outer grooves 63, 63 of differing width and/or depth provided on the coupling inner member 9 as can be further seen in this illustration.

Figure 6:
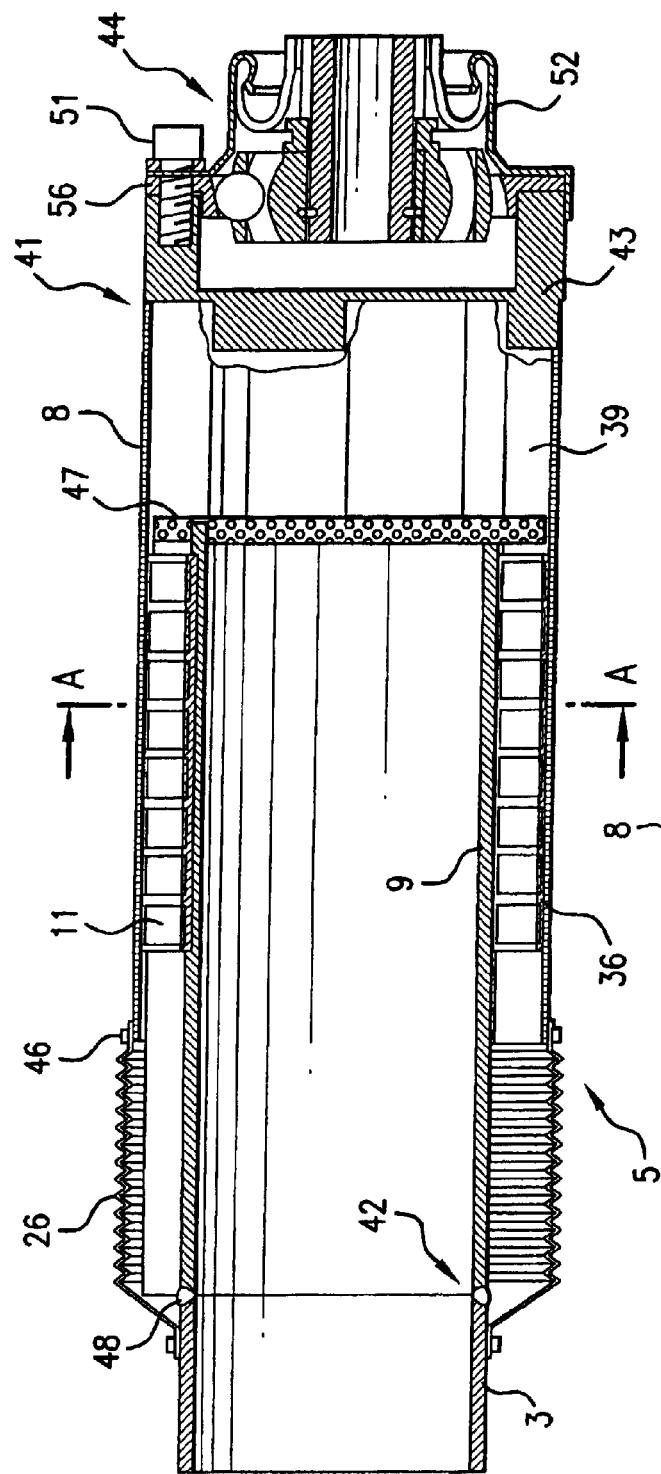
FIG. 6 is a longitudinal section illustration of a shaft coupling like in FIG. 3, but with another structure.

As shown in the longitudinal section schematic illustration FIG. 6 of the shaft coupling 5, the shaft coupling may also be connected, by its coupling outer member 8 for example, directly or through the already discussed flange 43, to an exterior part 56 of a constant velocity universal joint 44. It makes the most sense to connect the exterior part 56 of the joint to the flange 43 by means of screws 51. In this exemplary embodiment of the invention, a sealing sleeve 52 is moreover either stuck on the joint exterior part 56 or fastened to the joint exterior part by means of the screws 51 mentioned. There may however also be provided that the already mentioned expansion bellows 26 and/or the sealing sleeve 52 are at least partially surrounded each by a deflection resistant, tubular component in order to prevent these rubber elastic parts 26, 52 from expanding under the action of the centrifugal force.

As can further be surveyed from FIG. 6, the coupling inner member 9 may for example be connected to the drive or propeller shaft 3 by means of a weld connection 48. The expansion bellows 26 is thereby fastened to the shaft 3 and to the coupling outer member 8 by means of fastening means (clamping ring, screw) 46, which makes sense.

In another embodiment of the invention as shown in FIG. 6, elongated metallic inserts or cores 39 can extend from the flange 43 into the hollow spaces 37 of the hollow sections 16 of the coupling inner member 9 where they contribute to increasing the torsion resistance, the flexural strength and the torque transmission capacity. A non-rotatable connection with the coupling outer member 8 or the coupling inner member 9 can thus be achieved.

Figure 7:
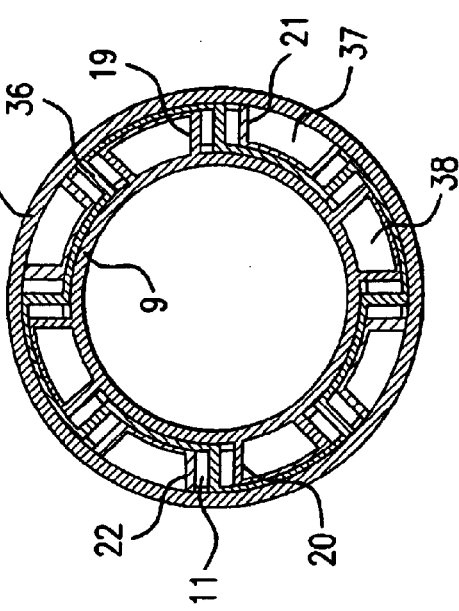
FIG. 7 is a cross-sectional view taken AA of FIG. 6.

Eventually, the FIGS. 6 and 7 show that the rolling members 11 must not necessarily be configured as balls but may have the shape of a barrel or of a cylinder. The rolling members 11 may also be aligned in a plurality of individual rolling member cages (plate cages 36) and each of said plate cages 36 can be disposed in one of the numerous coaxial rolling member passages which are at least two in number.

Figure 8:
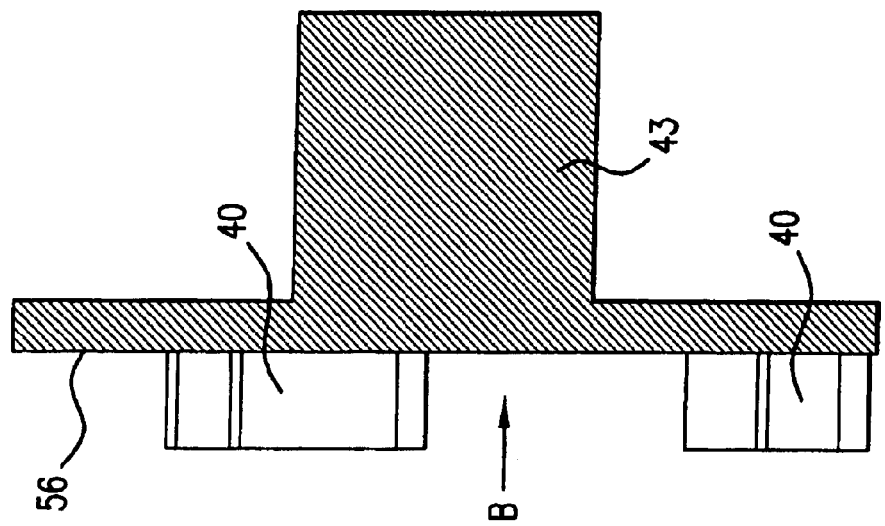
FIG. 8 is a cross-sectional view of a connecting flange.
Figure 9:
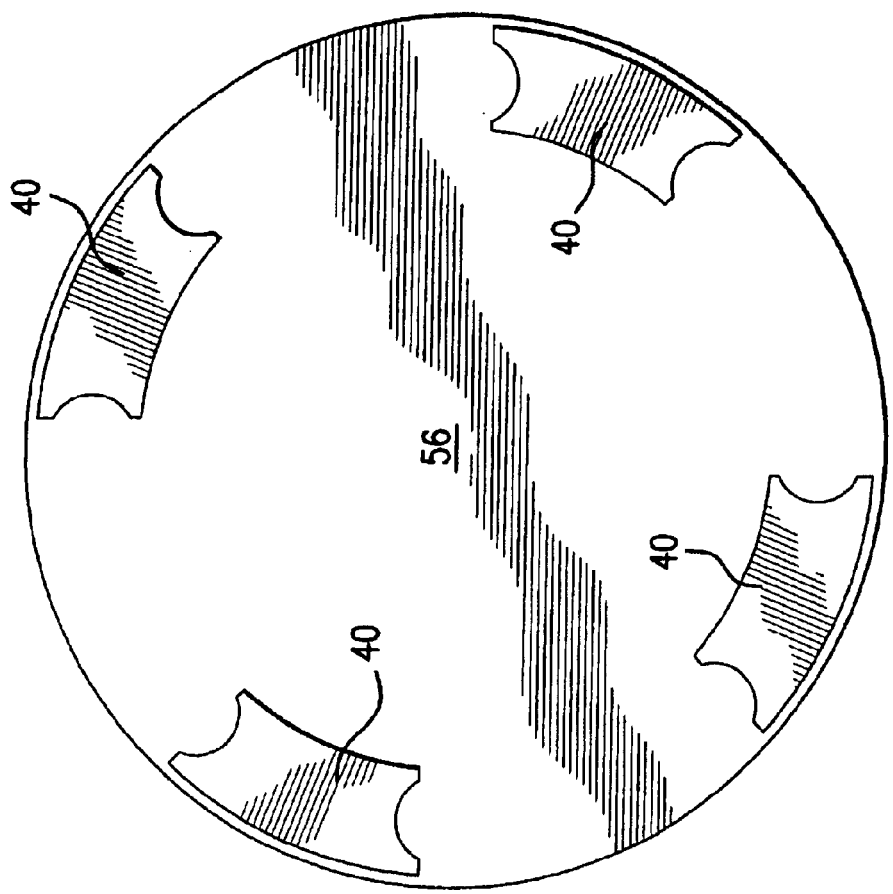
FIG. 9 is a top view B of the flange of FIG. 8.

The FIGS. 8 and 9 respectively show a schematic side view and a view "B" of the front side 56 of flange 43 that illustrate how the metallic inserts or cores 40 are disposed on the front side 56 of the flange 43 which is directed toward the coupling outer member 8. This illustration also shows that the inserts or cores 40 have a geometry and dimensions such that they are accurately fit in the hollow spaces 37 of coupling outer member 8 or in the grooves 28.

Besides connecting the coupling outer member 8 to the flange 43, it is also possible to connect the coupling inner member 9 to a flange of a similar design. The inserts or cores 39 would then engage in the hollow spaces 38 in the hollow sections 16 of the coupling inner member 9 or in the grooves 27 between the hollow sections 16 mentioned in order to form a non-rotatable but axially releasable plug-type connection between the shaft coupling 5 and the drive shaft portions 3 disposed upstream or downstream thereof.

Figure 10:
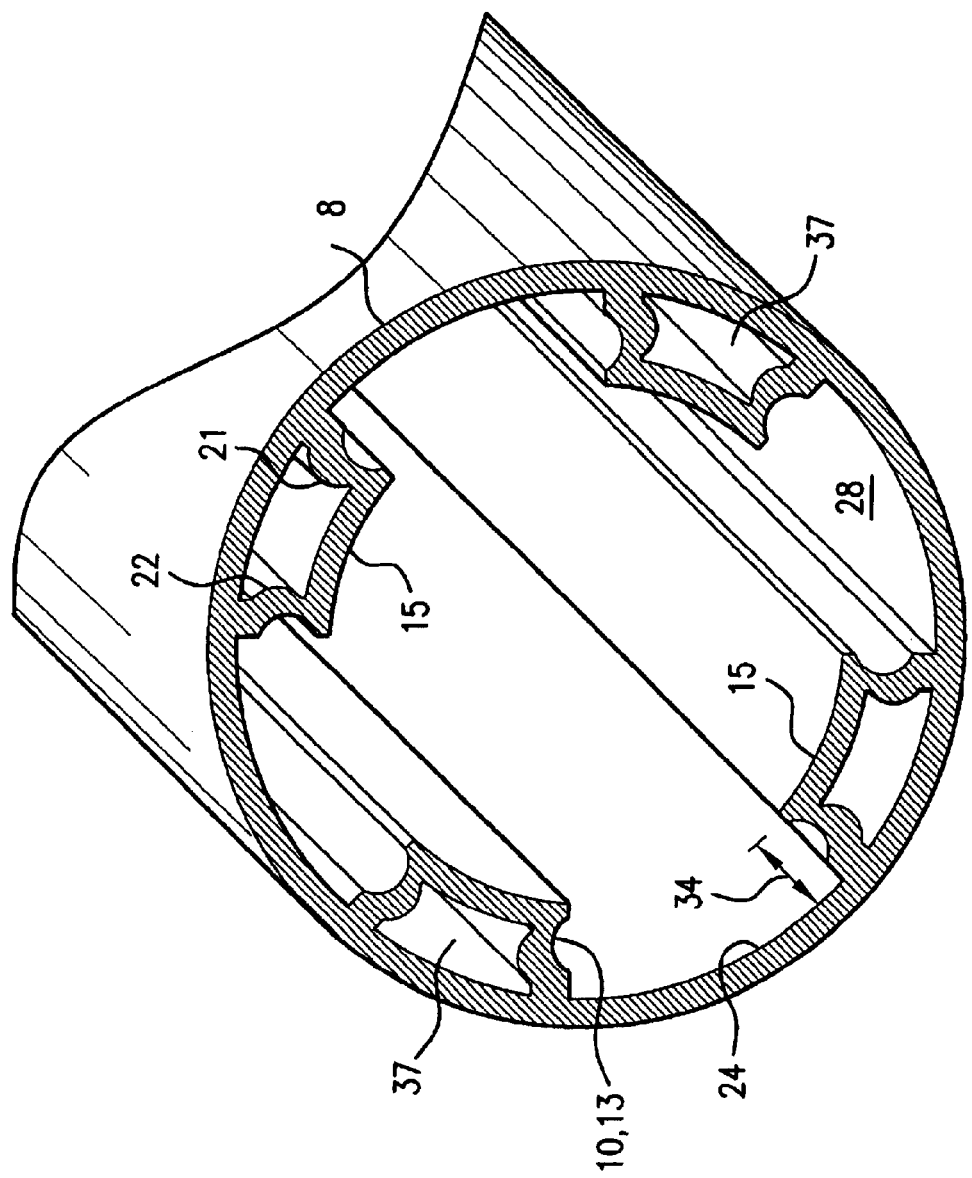
FIG. 10 is a cross-sectional view of a coupling outer member with a fully closed circumference.

FIG. 10 shows a schematic three-dimensional illustration of an extruded coupling outer member 8, all of the components of the coupling outer member 8 having the same wall thickness. This view illustrates how the longitudinal grooves 28, which are defined by the side walls 21, 22 of the hollow sections 15, are formed by disposing the hollow sections 15 with the hollow spaces 37 thereof on the inner side of the coupling outer member 8. The height 34 of these side walls 21, 22 extends from the bottom 24 of the groove to the upper edge of the hollow section 15 and is at least as high as a rolling radius 35 of the rolling member 11 (also see FIG. 11). It can also be surveyed from this Fig. that the rolling members 11 can be guided in axially parallel rolling member passages 10, 13 that are formed on the outer side of the side walls 21, 22 of the hollow sections 15. The counterpart 14 of these rolling member passages 13 is located on the side walls 19, 20 of the hollow sections 16 on the outer side of the coupling inner member 9 which have been omitted for purposes of clarity.

Figure 11:
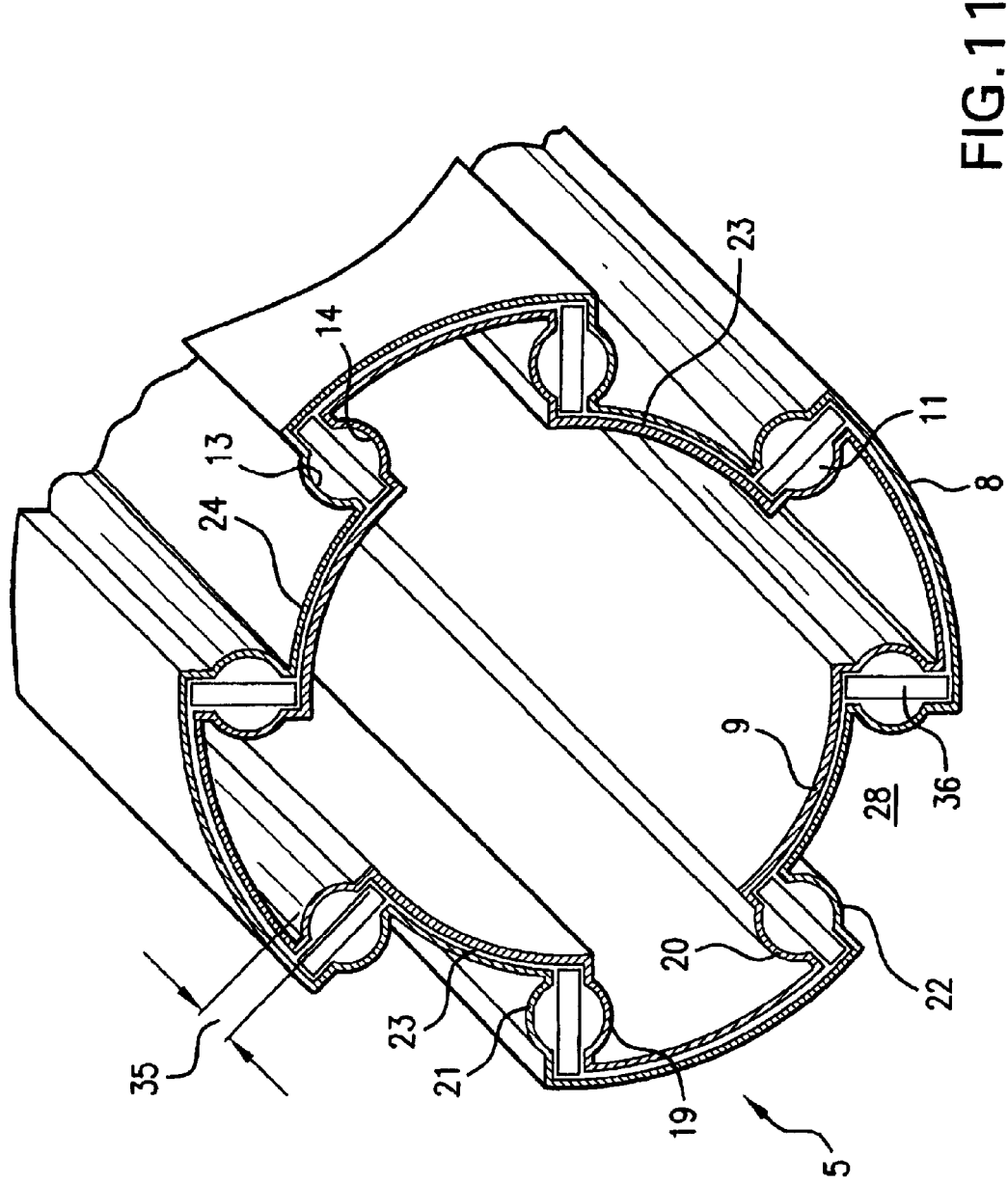
FIG. 11 is a cross-sectional view of a shaft coupling with a partially closed circumference.

Finally, FIG. 11 shows a schematic three-dimensional cross-sectional view of a shaft coupling 5 built according to the fundamental principle of the invention and comprised of an extruded coupling inner member 9 and of an also extruded coupling outer member 8. The circular inner or outer surface of these shaft coupling components 8, 9 is not fully closed. The grooves 27, 28, which open radially outward, are rather formed by recesses in the tubular coupling inner member 9 or coupling outer member 8 that are defined by side walls 19 through 22. These two shaft coupling components 8, 9, which have a very similar geometry, have only slightly differing diameters so that they may be inserted into one another in the manner of a shaft coupling inner member and a shaft coupling outer member. The side walls 19 through 22 are provided with rolling member passages 13, 14 that are formed in the circumferential direction for receiving rolling members 11, the rolling members 11 being inserted into said passages while being held together by plate cages 36.

All of the embodiments of the invention discussed herein above follow the same principle, which is to apply the force to be further transmitted to the rolling members in the circumferential direction of the shaft coupling during torque transmission. A maximum torque transmission efficiency is thus achieved and the displacement unit is protected from adverse effects such as the boring friction in the rolling member passages.

I claim:

1. A shaft coupling for a drive shaft (3), comprising:
a driving and a driven coupling component in which the driving or the driven coupling component is configured to form a cylindrical hollow coupling outer member (8) and the other coupling component configured to form a cylindrical coupling inner member (9), said two members being disposed so as to be coaxial with the longitudinal axis of the shaft coupling, and in which axially parallel grooves (27, 28) that are provided with right- and left-sided side walls (19, 20, 21, 22) are formed on the inner circumference of the coupling outer member (8) and on the outer circumference of the coupling inner member (9) for receiving rolling members (11) that drivingly and axially slidably interconnect the coupling outer member (8) and the coupling inner member (9), the right- and left-sided side walls (19, 20, 21, 22) of the coupling inner member (8) and of the coupling outer member (9) being disposed side by side to extend substantially radially and to oppose one another in the circumferential direction and meshed together such that rolling member passages (13, 14) are formed and each confine rolling members so that the rolling members transfer torque exclusively tangent to a circumference of rotation of the drive shaft at a center of the rolling members.

2. The shaft coupling according to claim 1, wherein the rolling members (11, 57 and 60) are made from a plastic material or from metal and the rolling members (11, 57 through 60) are configured to be ball-shaped, barrel-shaped or cylindrical, or the barrel-shaped and cylindrical rolling members (11, 57 through 60) are provided with an axially parallel bore.

3. The shaft coupling according to claim 1, wherein the side walls (19 through 22) of the coupling outer member (8) or of the coupling inner member (9) respectively extend radially in- or outward to such an extent that their height (34) is greater than or equal to the rolling radius (35) of ball-shaped rolling members (11, 57 and 60).

4. The shaft coupling according to claim 1, wherein the side walls (19 through 22) extend radially in- or outward to such an extent that their height (34) is smaller than or equal to the rolling radius (35) of barrel-shaped or cylindrical rolling members (11, 57 through 60).

5. The shaft coupling according to claim 1, wherein the rolling members (57 through 60) between the coupling inner member (9) and the coupling outer member (8) are disposed in pairs and are spaced a shorter or a greater distance apart, coaxial inner grooves (61, 62) of differing width or depth are provided on the coupling outer member (8) or coaxial outer grooves (63, 64) or differing width or depth are provided on the coupling inner member (9) separating the paired rows of rolling members.

6. The shaft coupling according to claim 1, wherein the rolling members (11, 57 through 60) are disposed in at least one rolling member cage (12).

7. The shaft coupling according to claim 1, wherein the rolling members (11, 57 through 60) of every single groove (27, 28, 61 through 64) are aligned one behind the other in a discrete elongated rolling member cage (plate cage 36).

8. The shaft coupling according to claim 6, wherein the rolling member cage (12, 36) is made of polyethylene or of a light metal alloy.

9. The shaft coupling according to claim 1, wherein all of the components of the coupling outer member (8) or of the coupling inner member (9) have the same wall thickness.

10. The shaft coupling according to claim 1, wherein the regions circumferentially disposed between two side walls (19, 20, 21, 22) of the axially parallel grooves (27, 28) are configured as hollow sections (15, 16) or as massive profiles (17, 18) in the coupling outer member (8) or in the coupling inner member (9).

11. The shaft coupling according to claim 10, wherein the coupling outer member (8) or the coupling inner member (9) are configured, together with the respective ones of their hollow sections (15, 16) or massive profiles (17, 18), as extruded profiles.

12. The shaft coupling according to claim 10, wherein the coupling outer member (8) or the coupling inner member (9) and the respective ones of their hollow sections (15, 16) or massive profiles (17, 18) are made from a plastic material or from metal.

13. The shaft coupling according to claim 12, wherein the coupling outer member (8) or the coupling inner member (9) is made from hardened or surface-coated hard anodized aluminum or magnesium.

14. The shaft coupling according to claim 13, wherein inserts or cores (39, 40), which are made from hardened steel, are inserted in the hollow spaces (37, 38) of the hollow sections (15, 16).

15. The shaft coupling according to claim 1, wherein the end portions (41, 42) of the shaft coupling (5), which are turned away from each other, are connected through a flange (32, 43) to a respective component of the drive shaft (3) disposed up- or downstream thereof or directly to a drive shaft joint (4, 25, 44, 54).

16. The shaft coupling according to claim 15, wherein the flange (43) has a front side (56) that is directed toward the end portion (41, 42) of the coupling outer member (8) or of the coupling inner member (9), coaxial inserts or cores (39, 40) being formed thereon in such a manner that they are exactly inverse to the geometry of the grooves (27 or 28) or of the hollow spaces (37, or 38) of the hollow sections (15 or 16) in the coupling outer member (8) or in the coupling inner member (9) respectively in order to form a plug-type connection.

17. The shaft coupling according to claim 15, wherein the flange (32, 43) is additionally connected to the coupling outer member (8) or to the coupling inner member (9) through a weld connection, a solder connection or by means of a ring and groove snap-on type connector to form a snap-on connection.

18. The shaft coupling according to claim 15, wherein a seal (31) is disposed between the rolling member passages of the coupling inner member (9) or of the coupling outer member (8) and the flange (32, 43) or a swivel joint (4, 25, 50, 54).

19. The shaft coupling according to claim 1, wherein the circular cross-sectional geometry of the coupling outer member (8) or of the coupling inner member (9) is not fully closed but is formed by a sequence of recesses (groove 27, 28) and lands (hollow section 15, 16) that are circumferentially distributed.

20. The shaft coupling according to claim 19, wherein the recesses (groove 27, 28) and the lands (hollow section 15, 16) are connected through side walls (19 through 22) that are oriented substantially radially and are provided in the circumferential direction with rolling member passages (13, 14) formed thereon.

21. A telescoping shaft coupling, comprising:
an outer tubular component for transmitting torque having an inner tubular wall and defining a shaft coupling axis;
an inner component for transmitting torque, the inner component being coaxially slidably received in the outer tubular component and having an outer wall opposing said inner tubular wall;
said outer tubular component having at least first and second side walls extending radially inward from said inner tubular wall;
said inner component having at least third and fourth side walls extending radially outward from said outer wall and respectively circumferentially opposing said at least first and second side walls along a common circle about the shaft coupling axis to respectively define at least first and second channels therebetween; and
rolling members disposed in each of said first and second channels oriented to permit telescoping relative movement of said outer tubular component and said inner component and to transmit torque exclusively tangent to a circumference of rotation of the telescope shaft coupling at centers of the rolling members between said first and third side walls defining said first channel and said second and fourth side walls defining said second channel.

22. The shaft coupling according to claim 21, wherein the rolling members are balls.

23. The shaft coupling according to claim 22, wherein the first, second, third and fourth side walls extend in a radial direction a distance greater than a radius of the balls.

24. The shaft coupling according to claim 22, wherein at least some of the first, second, third and fourth side walls extend in a radial direction a distance greater than a radius of the balls.

25. The shaft coupling according to claim 21, wherein the first, second, third and fourth side walls extend in a radial direction a distance greater than a radius of the rolling members.

26. The shaft coupling according to claim 21, wherein at least some of the first, second, third and fourth side walls extend in a radial direction a distance greater than a radius of the rolling members.

27. The shaft coupling according to claim 21, wherein the rolling members are cylindrical rollers.

28. The shaft coupling according to claim 27, wherein the cylindrical rollers have axes oriented radially with respect to said shaft coupling axis.

29. The shaft coupling according to claim 21, wherein the rolling members are barrel shaped rollers.

30. The shaft coupling according to claim 21, wherein said at least first and second channels include channels disposed in circumferentially adjacent pairs.

31. The shaft coupling according to claim 30, wherein said circumferentially adjacent pairs having differing circumferential spacings.

32. The shaft coupling according to claim 21, wherein said first and second side walls are interconnected by an interconnecting structure in regions excluding said first and second channels.

33. The shaft coupling according to claim 32, wherein said interconnecting structure defines hollow regions radially inward of said inner tubular wall and extending parallel to said shaft coupling axis.

34. The shaft coupling according to claim 33, further comprising first and second flanges attached respectively to an end of the outer tubular component and an opposing end of the inner component, said first flange having insert portions matching an interior geometry of the hollow regions and disposed in the hollow regions.

35. The shaft coupling according to claim 32, wherein said interconnecting structure defines solid regions radially inward of said inner tubular wall and extending parallel to said shaft coupling axis.

36. The shaft coupling according to claim 21, wherein said third and fourth side walls are interconnected by an interconnecting structure in regions excluding said first and second channels.

37. The shaft coupling according to claim 35, wherein said interconnecting structure defines hollow regions radially outward of said outer wall of said inner component and extending parallel to said shaft coupling axis.

38. The shaft coupling according to claim 37, further comprising first and second flanges attached respectively to an end of the outer tubular component and an opposing end of the inner component, said second flange having insert portions matching an interior geometry of the hollow regions and disposed in the hollow regions.

39. The shaft coupling according to claim 36, wherein said interconnecting structure defines solid regions radially outward of said outer wall of said inner component and extending parallel to said shaft coupling axis.

40. The shaft coupling according to claim 21, further comprising first and second flanges attached respectively to an end of the outer tubular component and an opposing end of the inner component.

* * * * *